United States Patent
Steinich

(10) Patent No.: US 7,610,684 B2
(45) Date of Patent: Nov. 3, 2009

(54) HINGE SENSOR

(75) Inventor: Klaus Manfred Steinich, Zorneding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 533 days.

(21) Appl. No.: 11/638,264

(22) Filed: Dec. 13, 2006

(65) Prior Publication Data

US 2007/0180890 A1    Aug. 9, 2007

(30) Foreign Application Priority Data

Dec. 13, 2005    (DE) .................. 10 2005 059 538

(51) Int. Cl.
*G01B 7/30* (2006.01)
(52) U.S. Cl. ......................... 33/1 PT; 33/194
(58) Field of Classification Search ............... 33/1 PT, 33/194, 534
See application file for complete search history.

(56) References Cited

U.S. PATENT DOCUMENTS

| | | | | |
|---|---|---|---|---|
| 5,163,228 A | * | 11/1992 | Edwards et al. ............ | 33/1 PT |
| 5,218,769 A | * | 6/1993 | Tranchon ................... | 33/1 PT |
| 6,104,480 A | * | 8/2000 | Matzo et al. ............... | 33/471 |
| 6,640,451 B1 | * | 11/2003 | Vinarcik .................... | 33/1 PT |
| 2004/0107586 A1 | * | 6/2004 | Nakamura et al. .......... | 33/1 PT |
| 2005/0138822 A1 | * | 6/2005 | Aikawa et al. ............. | 33/1 PT |
| 2007/0011896 A1 | * | 1/2007 | Diaz et al. ................. | 33/471 |
| 2007/0157477 A1 | * | 7/2007 | Sellien ..................... | 33/1 PT |

* cited by examiner

*Primary Examiner*—G. Bradley Bennett
(74) *Attorney, Agent, or Firm*—Head, Johnson & Kachigian

(57) ABSTRACT

The invention regards monitoring the functional position of a hinge through a non contacting sensor, in particular working with a magnetic field, comprising a rotation position generator and a sensor unit, measuring over an angular range, wherein the rotation position generator, in particular the magnet on the one hand, and the sensor unit with the sensor element on the other hand, are opposing each other at a distance, and are rotationally fixed on the one hand to one of the pivoting parts of the hinge, and on the other hand to one of the non moving parts of the hinge, or of the component carrying the hinge.

36 Claims, 14 Drawing Sheets

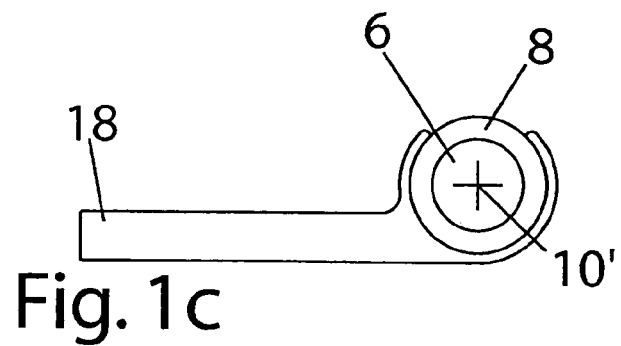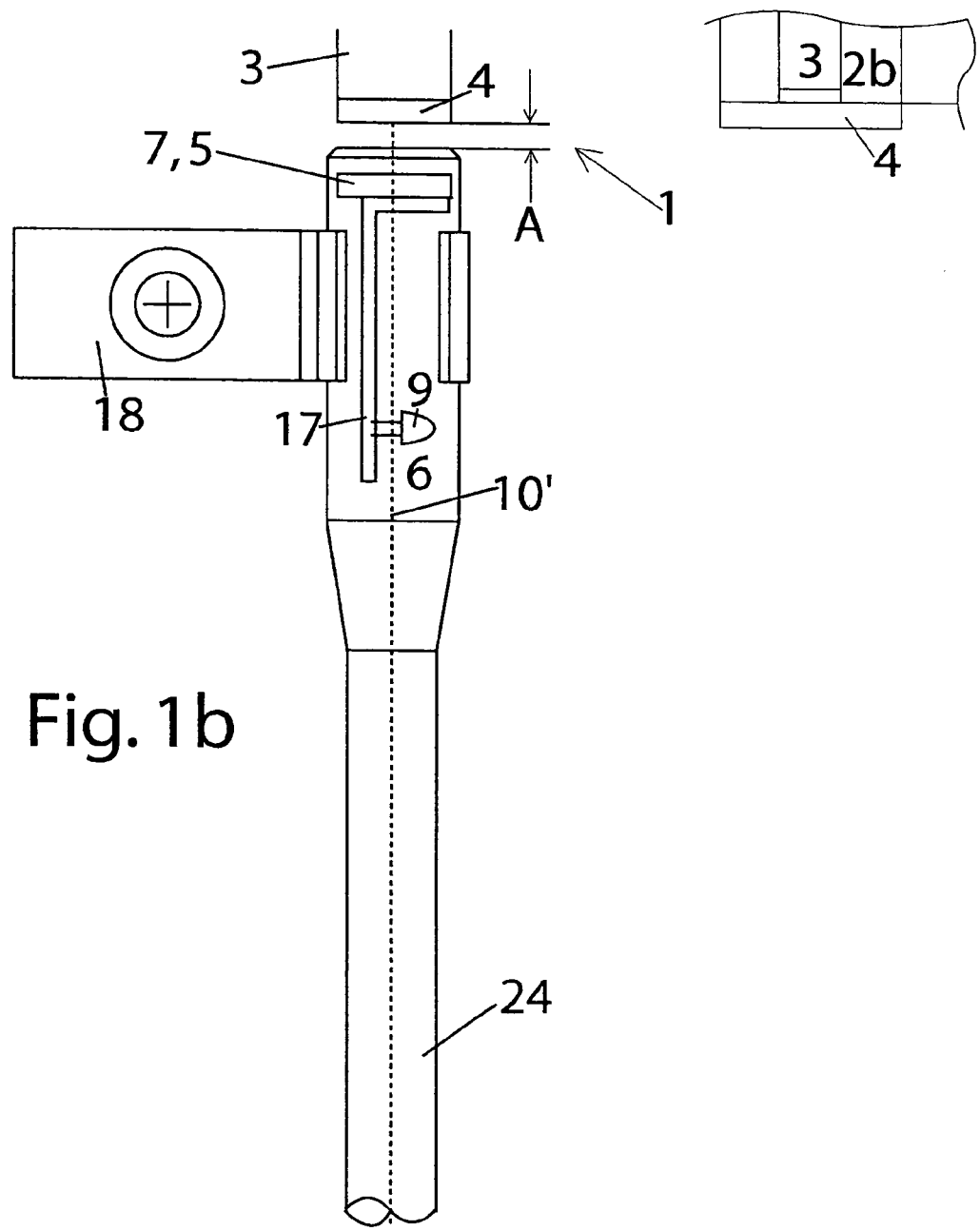

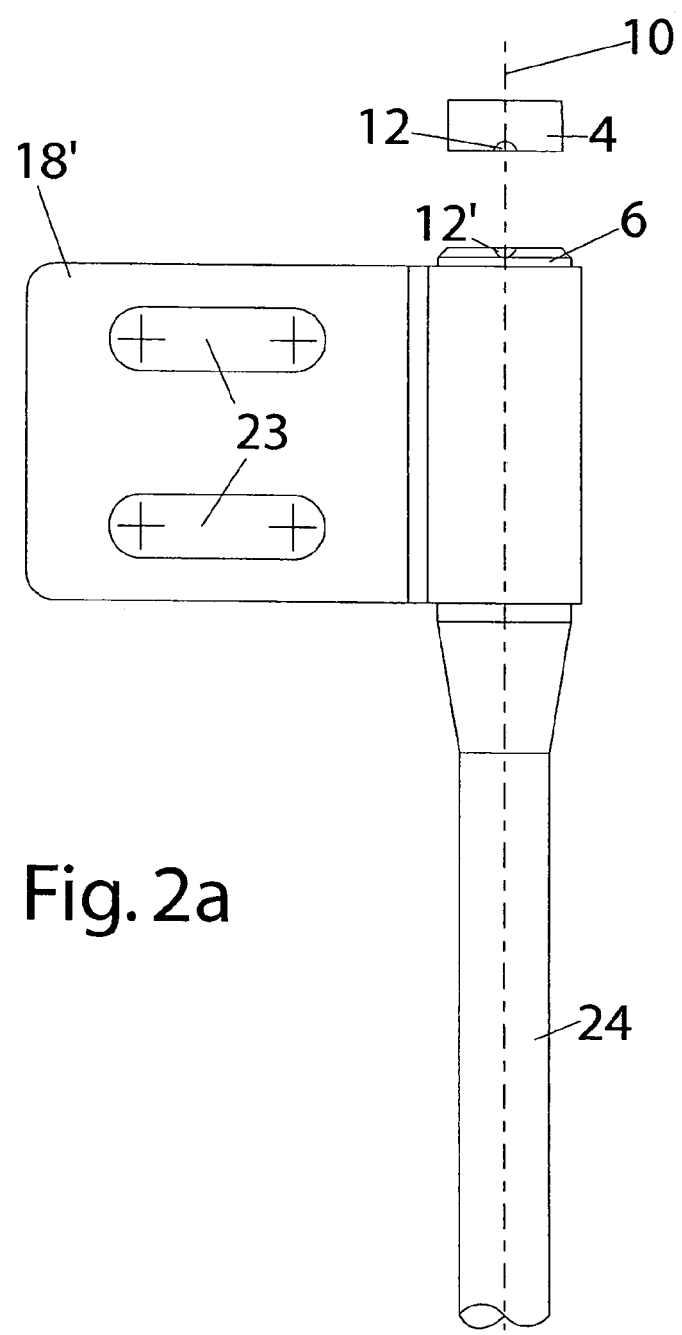

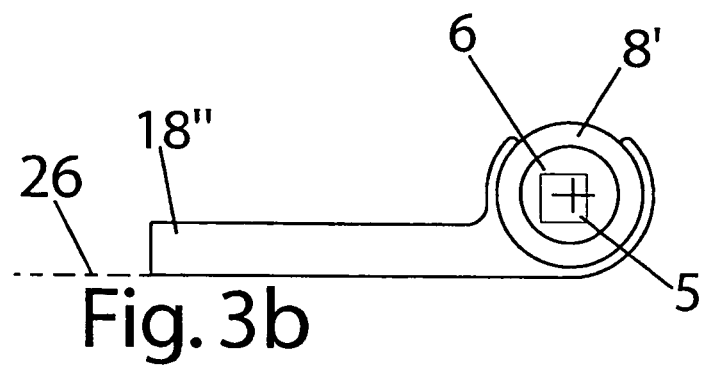
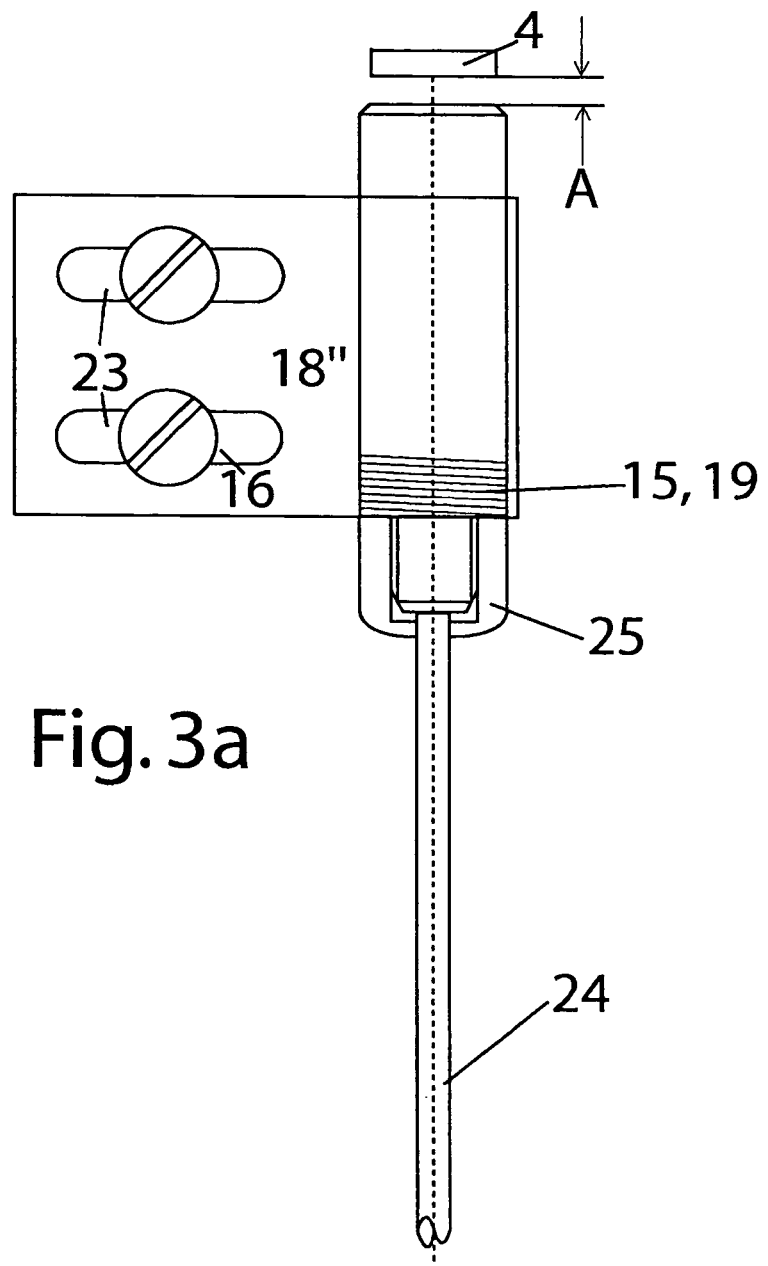

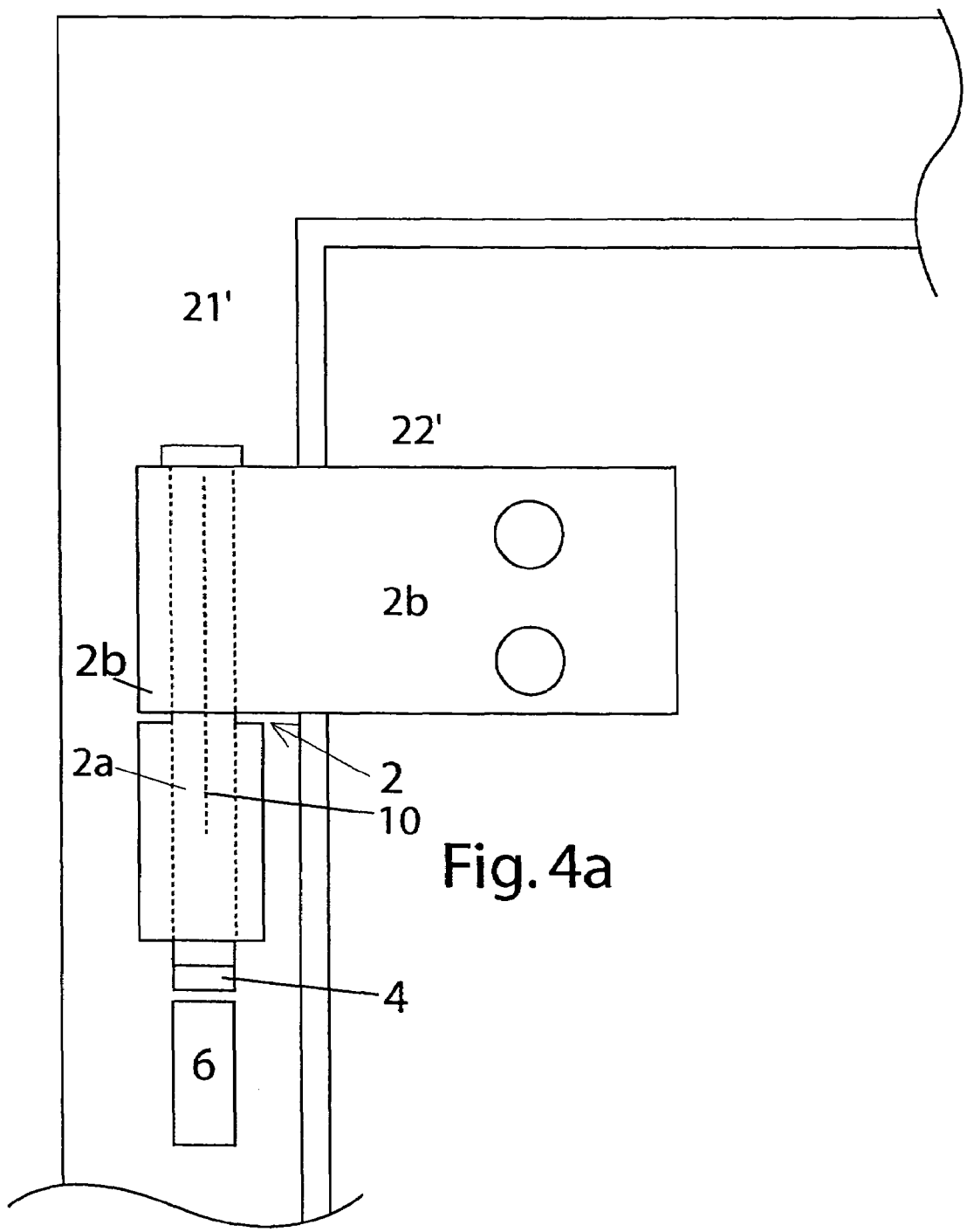

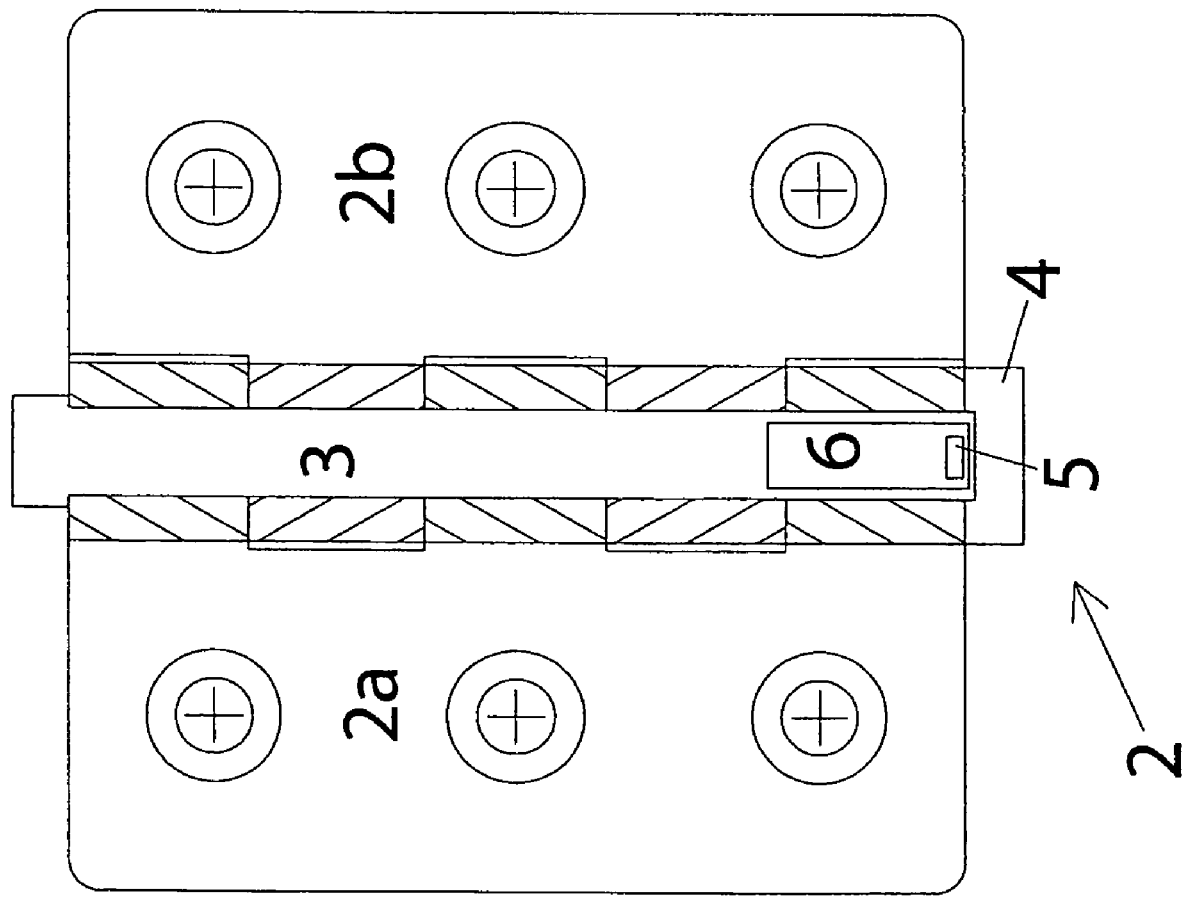

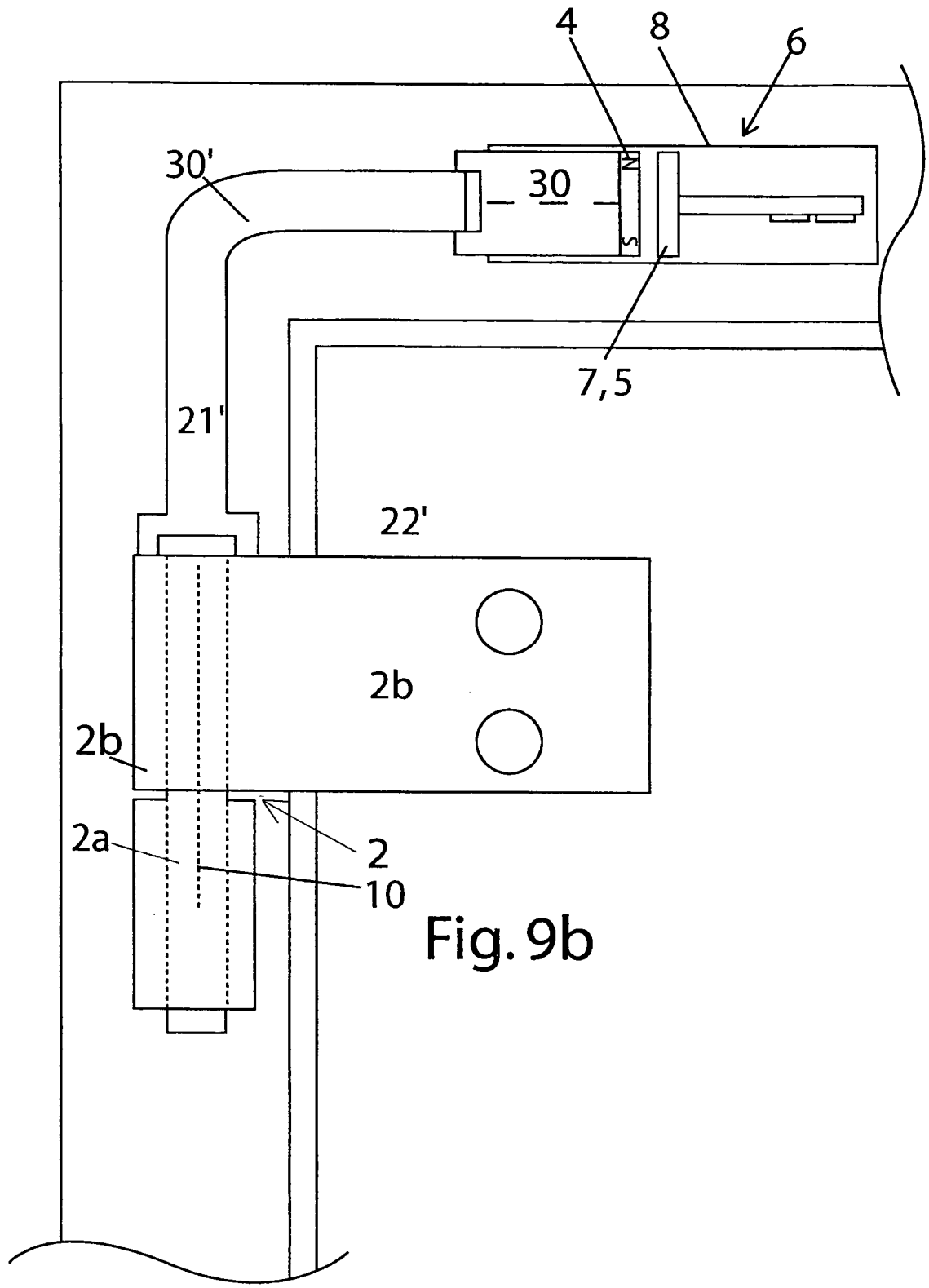

HINGE SENSOR

CROSS-REFERENCE TO RELATED APPLICATIONS

This application claims priority to German Patent Application No. 102005059538.3 filed 13 Dec. 2005.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention regards a process and a device for detecting the functional position of a hinge, wherein two hinge parts are pivotable relative to each other.

Pivotable components like doors, windows, flaps in buildings or industrial plants, etc. are mounted to a non-moving surrounding component through hinges, so they can pivot. Typical applications are flue gas flaps, mixing flaps, valve flaps, or safety doors.

In order to determine if the respective moveable component is in its closed or in its open functional position, it is state of the art to detect the functional position of the respective hinge through a hinge switch.

The advantage of a continuously measuring sensor at the hinge is that if the sensor allows this, any angular position of the hinge being detected, instead of only one defined switching position. Thereby not only the completely closed position of the pivotable component can be monitored, as it is possible with simple on/off contact switches which show e.g. the closed position at the opening side of the door or the window.

In a number of applications, however, it is not sufficient that the hinge sensor only displays "open" or "closed", that is, it displays one side or the other side of a single or of a second switching position.

Thus, it is necessary in technical applications, safety doors, and the like to know the exact angular position of the pivotable component at any time.

BRIEF SUMMARY OF THE INVENTION

Therefore, it is the objective of the invention to provide a sensor hinge and a process for its application, through which the current functional position of the hinge can be detected at any time.

Though the present invention is not limited to sensor elements operating through a magnetic field, for the following description this is assumed for reasons of transparency. The angle position generator is called a generator magnet or a magnet, depending on the functional principle of the sensor.

In order to reliably detect the current position of the pivotable component moved by the hinge and also the position of a door, window, or flap, one of the two functional components which are connected without electrical conductivity, forming the sensor, i.e. the rotation position generator, e.g. the generator magnet on the one hand, and the sensor unit with the sensor element on the other hand, are mounted to the components of the hinge, pivotable relative to each other and/or to the components carrying these components like e.g. the door frame and the door, especially they are located on the pivoting axis of the hinge, opposed to each other and spaced in axial direction.

Thereby, the particular design of the hinge is important.

A hinge, most of the time, consists of two hinge latches pivotable relative to each other around a pivoting axis. They are mounted to the components to be pivoted relative to each other (e.g. door frame and door).

A physical pivoting axle can be provided as a hinge bolt either in one piece integrally with one of the hinge latches or as a separate component insertable through respective openings in both hinge latches.

Thereby, if the hinge bolt is coupled with one of the hinge latches in a rotation-proof manner or if it is held without its rotation position being defined, this means it performs a non-defined partial rotation, it depends again on the particular design.

The two functional components of the sensor certainly may only be coupled in a rotation-proof manner to the components pivotable relative to each other. This means they are only coupled to the hinge bolt only when it is coupled in a rotation-proof manner to one of the two hinge latches, which under certain conditions can also be performed subsequently.

In case a sensor element is used which cannot only detect one or several discrete switching positions but continuously operates over a complete angular range, displaying the respective current relative rotation position between magnet and the sensor element, wherein the processing electronics are capable to process this. Thereby, the current rotation position of the hinge is detected and, thereby, of the component to be pivoted, like a door or a window. These signals are preferably communicated to a monitoring center since, typically, not only the functional position of a single pivotable component is of interest but a multitude of such components, e.g. all doors and windows in a particular building.

When the sensor, on the one hand, wirelessly transmits its signals to the monitoring center and, on the other hand, no hardwired energy supply is required for its energy supply, in particular the sensor is provided with energy in a wireless manner, the retrofitting effort, e.g. for monitoring all doors or windows of an existing building, is greatly reduced since all the wiring then becomes redundant, which would otherwise be necessary for every door and for every window having sensors connected via cables.

A simple functional control of the particular sensors becomes possible through an optical display of the correct function of the sensor, e.g. via a LED, which can also be visible in the closed housing of the sensor through the transparent housing.

The functional control should comprise as many potential sources for errors as possible, from a failure of the processing electronics to a magnet not present in the effective area of the sensor element to a broken cable, if the sensor is connected with a cable.

Since the generator magnet is preferably rotationally fixed to the pivoting hinge part, thus preferably to the pivoting hinge latch, it is preferably glued to the respective face of this hinge part, i.e. the hinge latch, glued to the pivoting axle or snapped on in a form engaging manner, while the sensor unit is preferably not mounted to the hinge but to the component carrying the non-moving hinge latch, e.g. a door frame, in line with the generator magnet, mounted to a pivoting axle at a distance.

Thereby, it is desirable to provide the sensor unit, which comprises the processing electronics in addition to the sensor element and to provide the sensor as small as possible.

This is accomplished, on the one hand, by using a microchip as a sensor element which contains a major portion of the processing electronics and directly reacts to changes of a magnetic field in its environment.

Furthermore, this is accomplished by the magnet opposing the microchip in a contact-less manner, directly affecting the sensor element (provided as a microchip) without an intermediary element. Thereby, alignment errors of the axles of the magnet, on the one hand, and the sensor element, on the other hand, are taken into account which, however, are acceptable in the context of the necessary detection precision required for these applications in order to keep the design complexity and the volume of the sensor unit as low as possible.

When mounting the sensor, in particular when retrofitting it to a hinge, the following are relevant for the correct subsequent function of the sensor: the maintenance of a correct axial spacing, the maintenance of a lateral displacement not too large, and the maintenance of an angular displacement not too large, between the longitudinal axes of the magnet and the sensor unit.

In order to assure this also after a first mounting and in order to be able to compensate for subsequent changes, e.g. through mounting the hinge or similar, the sensor unit can be received in a mounting device and mounted therewith to the carrier component. The mounting device can comprise adjustment devices for adjusting the position of the sensor unit, on the one hand, in axial direction of the pivoting axis of the sensor unit, and on the other hand, in at least one direction perpendicular to it.

For this, different mechanical solutions are conceivable, e.g. providing the mounting device in several pieces, thus with a base plate which is mounted to the carrier component in a fixed manner, e.g. bolted down, and a holder piece adjustable, e.g. slideable relative to it, wherein the slideability can be provided along one of the lateral axes, in longitudinal direction of the pivoting axis, or in both directions.

For the adjustability in axial direction, further more, a threaded connection can be provided between the exterior circumference of the particularly cylindrical sensor unit and a respective pass-through opening of the mounting device.

For zero adjustment, the sensor unit, on the one hand, and the magnet, on the other hand, can each have markers which have to be adjusted relative to each other in the direction of the pivoting axis during assembly. This can be accomplished through respective mechanical adjustment elements like a thread and a locknut, or a transversally extending clamping bolt.

All of the above, however, significantly increase the design complexity and, thereby, the price of such a sensor. In addition, the visual design of this openly visible element is influenced in a very technical manner so that a visual design according to the environment is hardly possible any more.

A much simpler and, thereby, less flexible and less easily adjustable possibility is to mount the sensor unit in a rigid manner to the carrier component, e.g. a door frame, to fixate it flush in the correct position and thereby simply gluing the sensor unit down, especially when the sensor unit is small and thereby light, and in particular, when it is not operated with cables and thereby no mechanical forces impact the sensor unit through the cable.

In order to assure that the selected positioning is the right positioning the first time, when gluing, the positioning is preferably determined through a mounting device, wherein different mounting devices adapted to the design and to the particular dimensions of the respective hinge can be used, or a universal mounting device which can be adapted to the particular dimensions of the respective kind of hinge for this purpose, which generally only has to be done once when retrofitting a multitude of doors or windows since typically all doors or windows use the same hinges.

The mounting device can be provided so that it is placed directly onto the hinge in a contacting manner and is, thereby, automatically correctly positioned relative to the hinge in an interlocking manner. This mounting device also comprises a design, in particular a gap, into which the sensor unit only needs to be inserted and glued to the carrier component in order to be placed in the correct functional position after removing the mounting device.

With the assistance of a mounting device, in particular the same mounting device, as for the sensor unit, it is possible to already position and glue the magnet correctly with respect to its zero position.

For this purpose, the magnet does not only have an optical marker but also an interlocking marker shaped as a protrusion or a groove through which it can work with a respective mounting device or also contacting the sensor unit itself, only for the mounting procedure.

The magnet is then positioned through an interlocking marker in the correct rotation position and correctly positioned on the pivoting axle of the hinge, moved forward against the hinge and fixed there, thus snapped in place or glued down. Thereafter, the component which has positioned it with respect to its rotation position is disengaged from magnet, this can be a mounting device, or the sensor unit itself.

In spite of gluing the sensor unit and/or the magnet, in case of new positioning, the effort can be kept small through the use of easily disengaged glues or adhesive foils which, in spite of a secure, non-slip fixation, can be disengaged for a long time thereafter without any problems.

In this way, it is possible with a mounting device fitted to the respective hinge to reach a mounting time of a sensor with wireless mounting in the range of one minute or below, while hardwired mounting would require one or several hours including putting down the wiring.

Even the arrangement of the relay stations, e.g. wirelessly receiving and amplifying the radio signals of the sensor and/or then conducting it via central cables, still drastically reduces the mounting time and expense compared to a cable connection of each particular sensor.

During wireless operation, the sensor unit comprises a sensor for wireless signal output, in particular through a radio transmitter working via radio frequencies. If the sensor additionally is to receive signals, e.g. for transmitting energy to the sensor, as it is performed with transponder technology, the sensor unit also includes a receiver for electromagnetic waves.

Depending on the importance of the functional position of the hinge to be detected, a high safety of the sensor against failure may be required. This can be accomplished through providing, especially the sensor element, in a redundant manner, e.g. the microchip. Two of those microchips can either be arranged on two printed circuit boards located in pivoting direction behind each other or on the two opposing sides of the same printed circuit board. The different rotational direction of the sensor elements has to be considered by the processing unit.

The generator magnet has to have at least a pair of magnetic poles distributed over its circumference. If it has several, e.g. four or six, different poles, in particular with these poles extending over unequal angular segments, with the help of two sensor elements, on the one hand an examination of the correct function of the primarily used sensor element can be accomplished, on the other hand also a detection of the current direction of the rotation of the hinge can be performed.

The more different poles the magnet has distributed over its circumference, the faster the rotation direction can be detected and the more different potential zero positions between magnet and sensor unit are possible.

In order to not interfere with the sensor unit, in particular with the processing electronics through environmental influences, the housing of the sensor unit is closed tight, in particular welded or glued. Preferably, the electronics inside the housing are encased with hardening plastic wherein the microchip acting as a sensor element can also be encased.

A suitable design of the sensor element is a cylindrical housing shape having a diameter that is not larger than a diameter of the hinge in the bolt area, this means not larger than 18 mm, preferably not larger than 8 mm. Thereby, such a sensor unit mounted in line with the pivoting axis of the hinge does not protrude further radially than the bolt area of the hinge itself, whereby damages become highly unlikely, in particular tearing off from the door or from the window.

Depending on the application, other housing shapes can have advantages, e.g. an L shape wherein preferably only the sensor element is mounted in one arm, preferably in the smaller one, extending perpendicular to the pivoting axis at a distance from the magnet, while all remaining functional elements up to the radio transmitter/radio receiver are housed in a larger other arm of the L shape.

The advantage of this design, especially, is that the other arm and thereby the main part of the housing can be directly mounted to one of the two hinge latches and can form thereby a unit, in particular, together with the hinge which provides advantages for the first installation. In this case, no additional work has to be performed beyond the mounting of the hinge which has the sensor already mounted to it.

For certain applications, it can also be useful to house the sensor unit well protected against external influences and mechanical damage.

For these cases, it can be useful to house the sensor unit in the hinge bolt, wherein for retrofits, preferably the present hinge bolt is replaced with a hinge bolt, where the wall of the housing of the sensor element forms the functional surface of the hinge bolt at the same time.

The sensor element, also in particular the microchip used for it, is then located close to the frontal face surface of the hinge bolt so that the magnet working together with it can be mounted in a respective axial distance on the frontal surface of the hinge on one of its latches.

In this case, the hinge bolt forming the sensor unit certainly has to be mounted to the other hinge latch or still needs to be mounted so it cannot rotate relative to it.

BRIEF DESCRIPTION OF THE DRAWINGS

According to the invention are subsequently described in more detail.

FIGS. 1a-c show a first application of the hinge sensor.
FIGS. 2a-b illustrate a second design of the sensor.
FIGS. 3a-b show an additional design of the sensor,
FIGS. 4a-b show a wireless sensor.
FIGS. 5a-b illustrate components of the sensor integrated into the hinge bolt.
FIGS. 9a-b show the connection of the hinge through a mechanical clutch.

DETAILED DESCRIPTION OF THE INVENTION

Figure 1A:
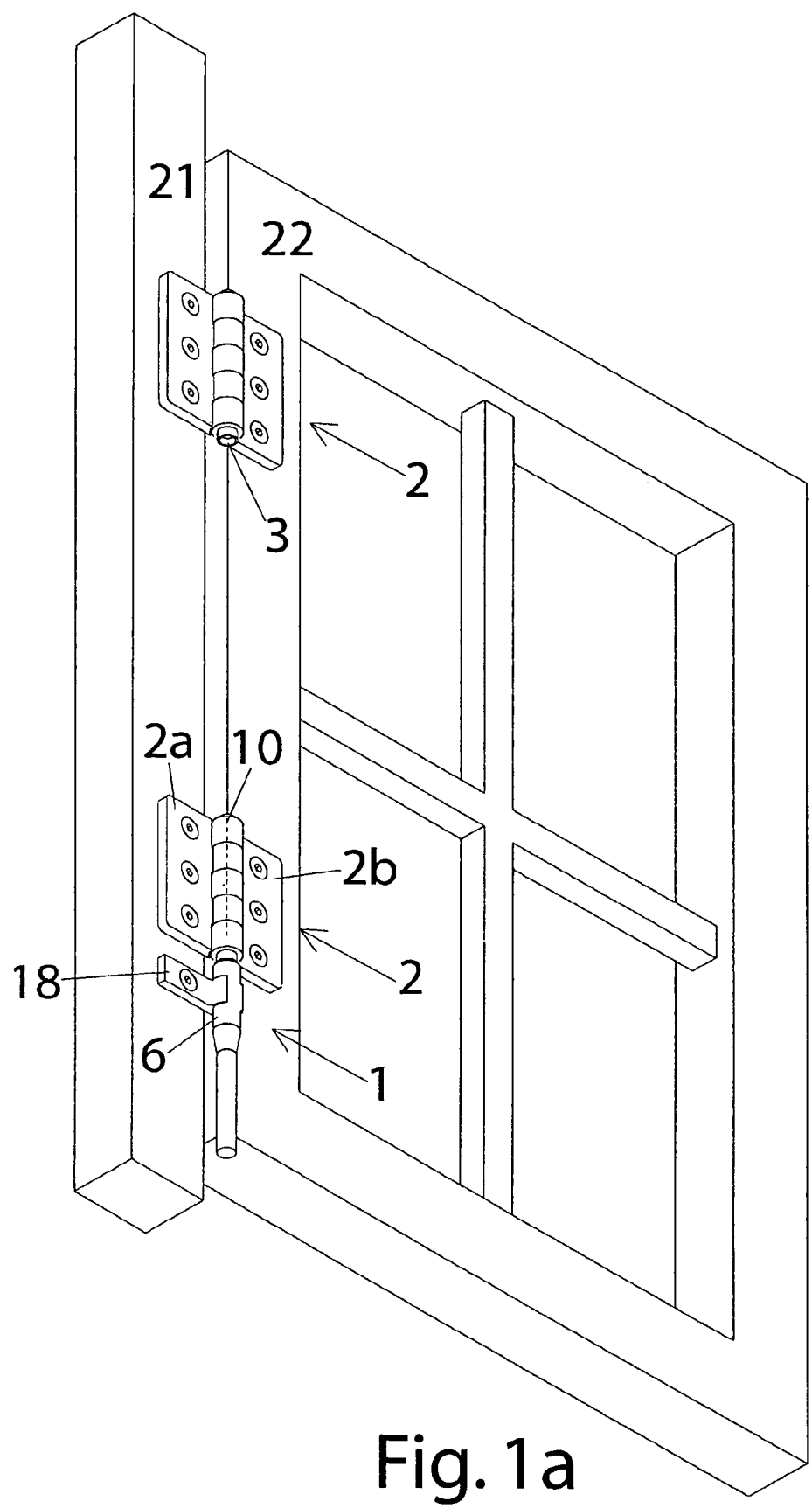

FIG. 1a shows atypical application of retrofitted hinges 2 through which a window 22 is pivotably connected with a window frame 21, which is shown only partially.

As it is known, hinge 2 comprises two hinge latches 2a, b working together, one of which is mounted to window frame 21 and the other one mounted to window 22.

Their pass-through openings are lined up and one hinge bolt 3 each is inserted through both in order to work as a pivoting axle 10.

The lower one of both hinges 2 is retrofitted with a sensor 1 according to the invention, as can be seen from enlarged FIGS. 1b and 1c. A sensor unit 6 is mounted with a mounting device 18 in line with pivoting axis 10 at window frame 21. A generator magnet 4, influencing sensor unit 6, is mounted to a lower front surface of the hinge in line with pivoting axis 10, thus at pivoting hinge latch 2b or hinge bolt 3 (as shown in FIG. 1b), when hinge bolt 3 is coupled in a rotationally fixed maimer with hinge latch 2b.

In the hinge 1 embodiment as can be seen from FIG. 1a, sensor unit 6 and pivoting axis 10 are located exactly over a gap between window frame 21 and window 22. Sensor unit 6 is mounted to window frame 21 via a plate-shaped mounting device protruding in lateral direction to pivoting axis 10' of sensor unit 6. Sensor unit 6 is approximately cylindrical and contains a sensor element 5 close to one front face and from which a cable 24 is run out from the other face end.

Sensor unit 6 has a round, external circumference which can be snapped into an accordingly sized C-shaped holder of a mounting device 18 while being slideable in the direction of pivoting axis 10'.

A generator magnet 4 is spaced in axial direction and is either glued to a front face of hinge bolt 3 or to a front face of hinge latch 2b, pivotable around a pass-through bore.

Through sliding sensor unit 6 in axial direction along pivoting axis 10' relative to mounting device 18, an axial spacing "A" between magnet 4 and sensor element 5 can be adjusted, which is of great importance to the correct functioning of the sensor.

As FIG. 1b in a longitudinal cut of sensor unit 6 shows, furthermore, as a sensor unit 5, a microchip 7 is being used which is mounted to an arm of an L-shaped folded printed circuit board 17, possible partially flexible, which also contains a part of the processing electronics. The printed circuit board 17 carries a LED 9, in this case on the other arm of the L-shaped circuit board, optically showing the correct function or an error of sensor 1. For this purpose tight housing 8 of sensor unit 6 is transparent, that is, at least transparent for the light emitted by LED 9.

FIG. 2a shows a design wherein only a mounting device 18' is selected in a different manner, the holder part for receiving sensor unit 6 being a circumferentially closed profile.

Furthermore, the plate-shaped protrusion of holder part 18' is provided for mounting to the underground with two slots, perpendicular to the pivoting axis 10', in order to be able to compensate for a lateral displacement of hinge 2 relative to pivoting axis 10'.

In FIG. 2a, furthermore, at one position of a circumference of magnet 4, as well as close to the front face at sensor unit 6, a zero marker 12, 12' is located. The zero markers 12, 12' have to line up with each other in a selected zero position of the hinge (e.g. the completely open, or the completely closed position).

FIG. 3 shows a design of the sensor similar to FIG. 2 but differs in so far as housing 8 of sensor unit 6, seen in cross section, sensor element 5, thus typically the microchip 7, is eccentrically located relative to an exterior circumference of the housing 8. Through rotating housing 8 in mounting device 18 sensor, which is possible through a thread 19 on an external circumference of housing 8 as a first positioning device 15, on the one hand the axial position and, on the other hand, the distance of the sensor from a base surface 26, onto which the mounting device 18" is mounted, can be adjusted.

The lateral distance can be adjusted along base surface 26 through slots 23 as a second adjustment device 16 through which the bolting of the adjustment device 18" to the base is performed. During assembly, one can proceed so that initially the correct axial distance "A" is set through bolting along the first adjustment device 15 and upon completion, the correct distance of sensor 5 to base surface 26 is adjusted. The resulting zero rotation position of sensor unit 6 must also be maintained for magnet 4, which is to be fastened subsequently.

If the magnet has already been mounted previously, the rotation position of sensor unit 6 has to be adjusted so that the distance of sensor unit 5 to base surface 26 cannot be selected freely any more.

The compensation in lateral direction is performed through sliding of mounting device 18 along slots 23.

The rotation position of sensor unit 6 relative to mounting device 18 can be fixed through a locknut, threaded onto the exterior thread of sensor unit 6 for which a grommet 25 can be used, support against mounting device 18, which is to be threaded onto a socket 29 as a cable exit, securing a plug to be inserted in this location.

FIG. 4 shows an application of sensor 1 with a fundamentally different hinge wherein the pivoting axis 10, and thereby hinge bolt 3, are completely located on door frame 21'. The respective hinge latch 2a is basically cylindrical, while the other hinge latch 2b mounted to the door 22' reaches out far enough so that it protrudes up to pivoting axis 10 on door hinge 21'.

In this case no lateral offset of sensor 1 through a mounting device is necessary. Therefore, sensor unit 6 can be mounted with its longitudinal axis in line with pivoting axis 10, in this case, directly below hinge 2, preferably through gluing as shown in FIG. 4a. Magnet 4 is thereby glued to a lower face of the separate hinge bolt 3 protruding from lower hinge latch 2a which is rotationally fixed e.g. through a clamping bolt 27 to hinge latch 2b bolted to door 22'.

Figure 4B:
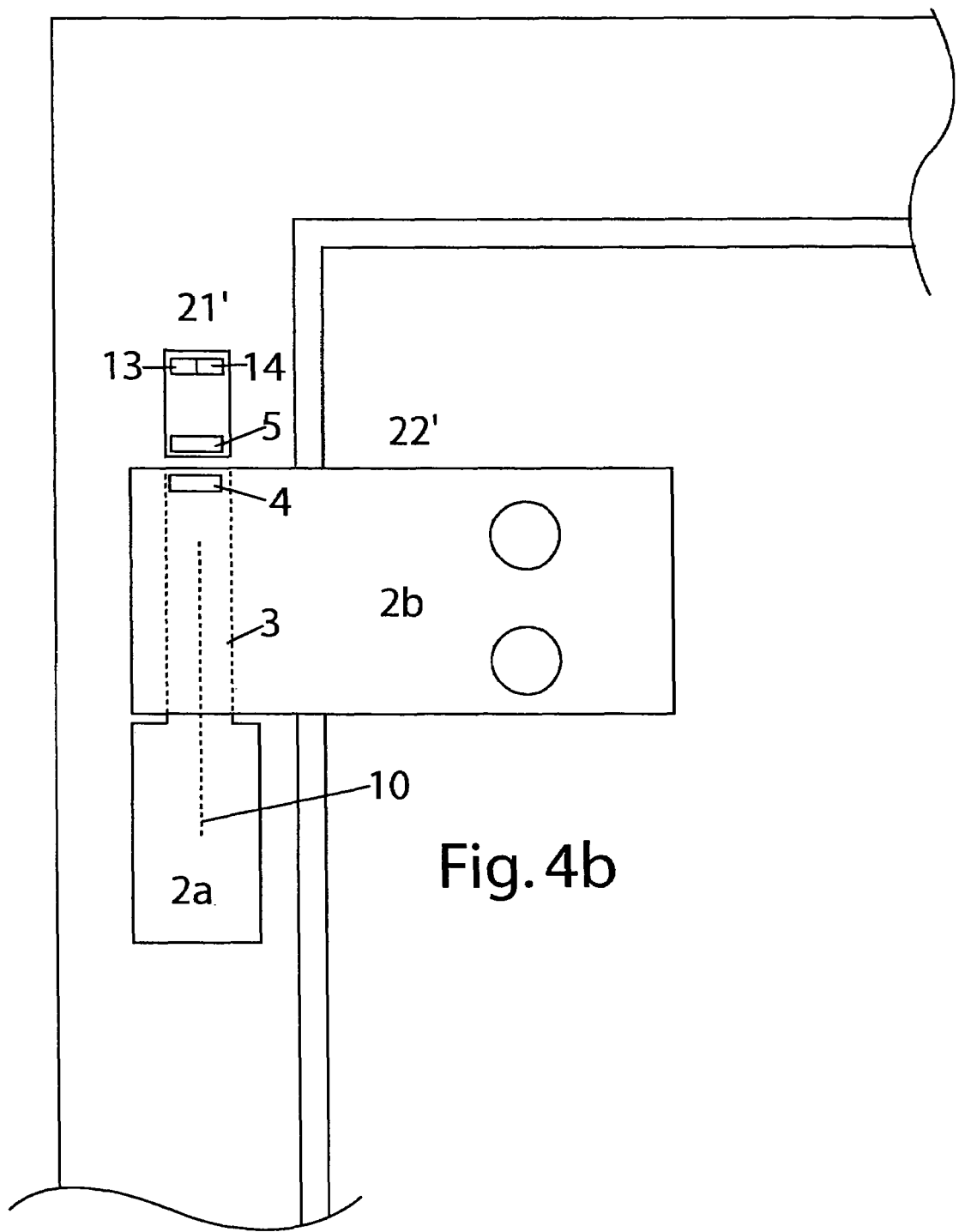

On the other hand, FIG. 4b shows an application wherein hinge bolt 3 is not a separate component but integrally formed with hinge latch 2a as an upward protruding pinion fastened to door frame 21'. The other hinge latch 2b has a respective opening and is placed onto a free end of hinge bolt 3 from above.

In this embodiment, sensor unit 6 is glued to door frame 21' above an upper end of the hinge in line with its pivoting axis 10. Disk shaped magnet 4 is glued to an upper face of the non-moving hinge bolt 3 as long as it is not recessed too far into the pivotable hinge latch 2b. Otherwise, spacer elements have to be placed there.

In FIG. 4, sensor unit 6 is shown as a wireless unit, accordingly comprising at least one transmitter, in particular a radio transmitter 13, possibly also a receiver, in particular a radio receiver 14.

Figure 5A:
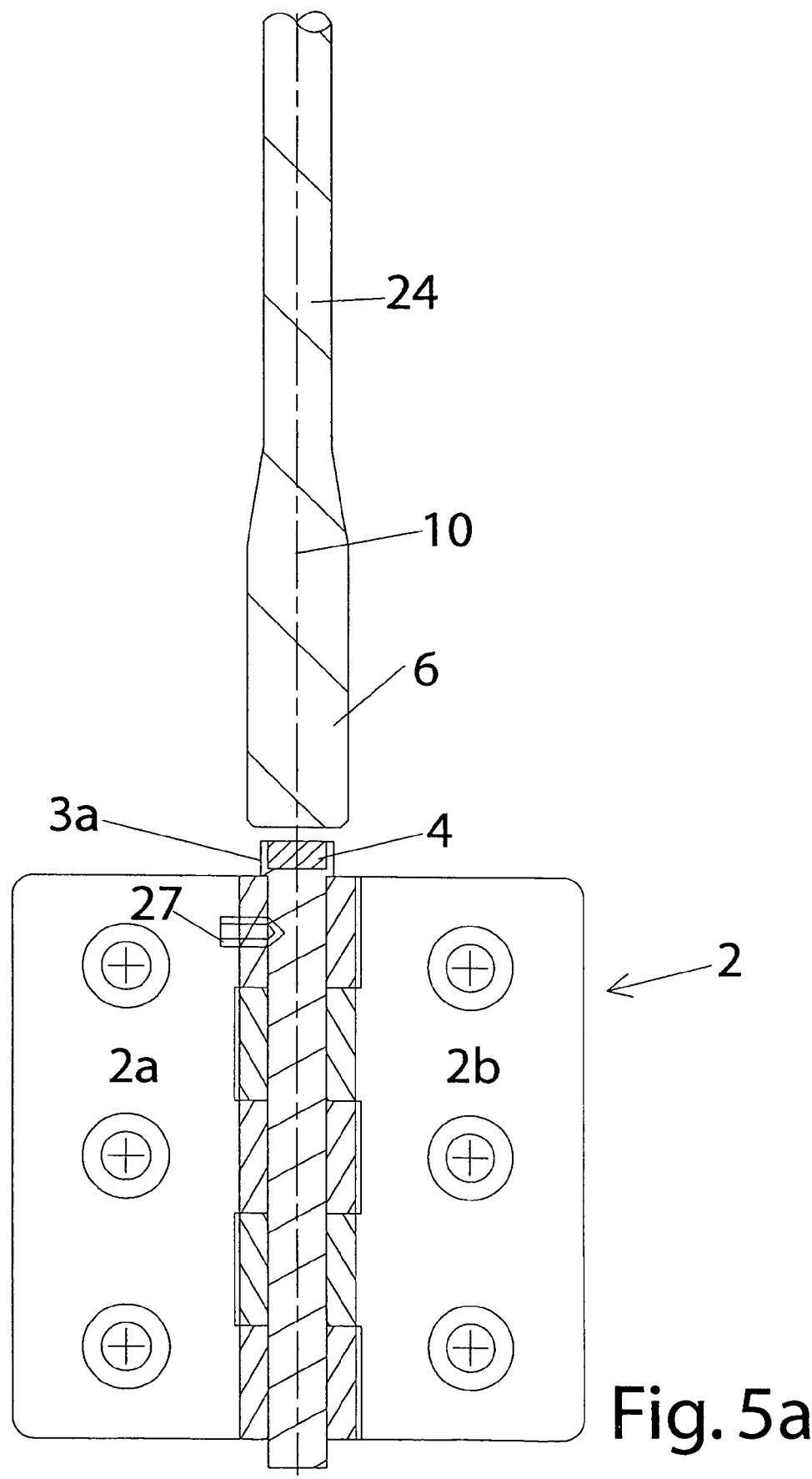

On the other hand, FIG. 5a shows a solution similar to FIGS. 1 and 2 with magnet 4 on hinge 2 and a hardwired sensor unit 6 on the extended pivoting unit 10.

However, magnet 4 hereby is not glued to one of the parts of hinge 2 but receded into a therefore provided frontal gap of hinge bolt 3 which, on the other hand, requires that hinge bolt 3 pivots with the pivoting hinge part, e.g. 2a, which is accomplished through a clamping bolt 27 extending in lateral direction.

FIG. 5b on the other hand shows the reverse solution.

In a face surface, that is, in the front face surface in insertion direction of hinge bolt 3, a dead hole or pass-through hole is located wherein a preferably cylindrical sensor unit 6 is located, e.g. threaded or glued in.

Magnet 4 is in line with pivoting axis 10 and glued to a front face of hinge 2, thus to the other hinge latch (e.g. 2b), which is rotationally fixed to hinge bolt 3.

If, thereby, hinge bolt 3 and also sensor element 5 protrudes too far from the hinge, magnet 4 has to be placed in the right distance relative to the hinge and relative to sensor element 5 through annular spacers.

Figure 6A:
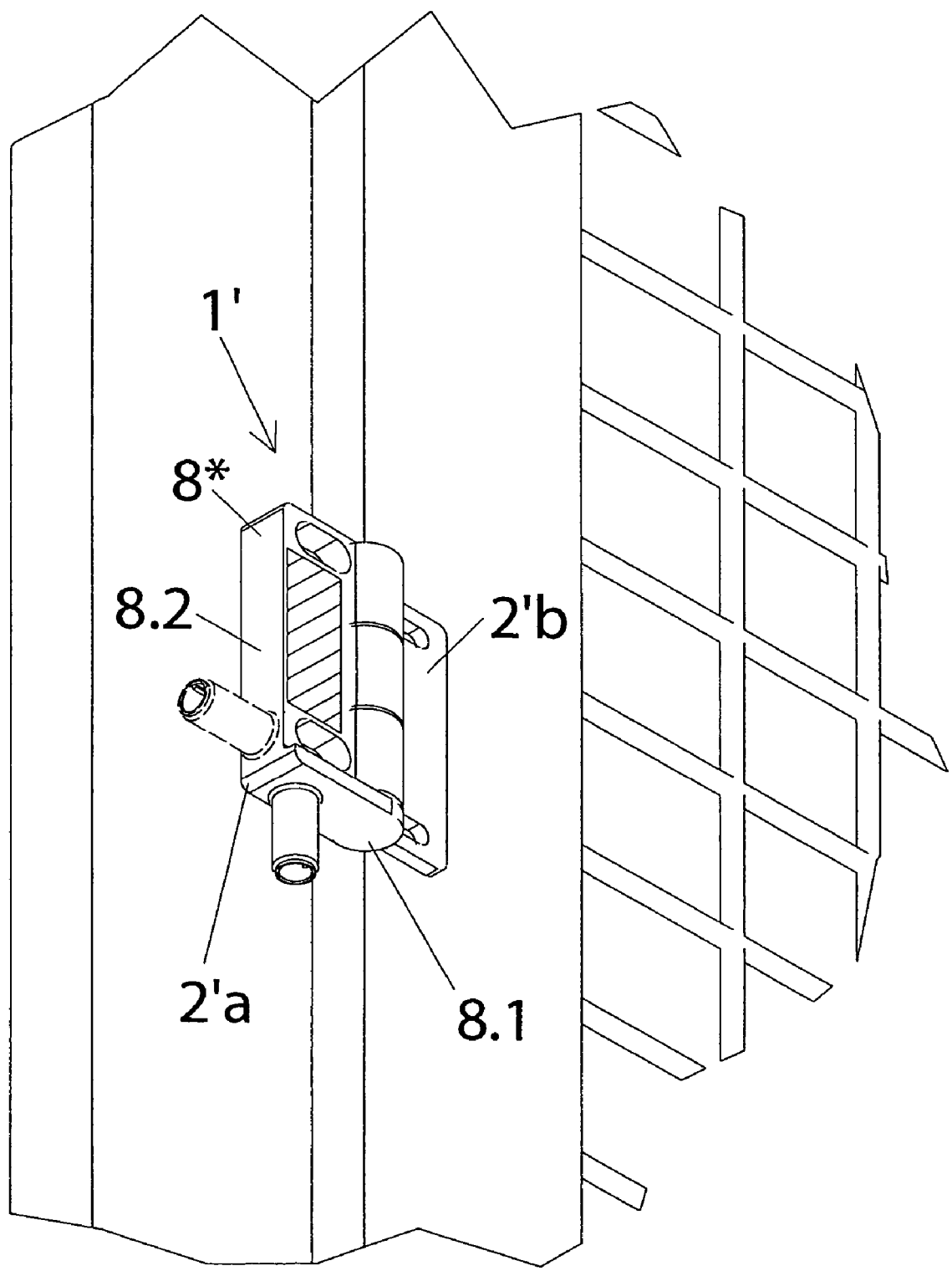
FIGS. 6a-c show a first design for an initial installation of hinges.

FIGS. 6 show a sensor 1' with an L-shaped housing 8* that is preferably provided together with hinge 2" for a new installation.

Figure 6C:
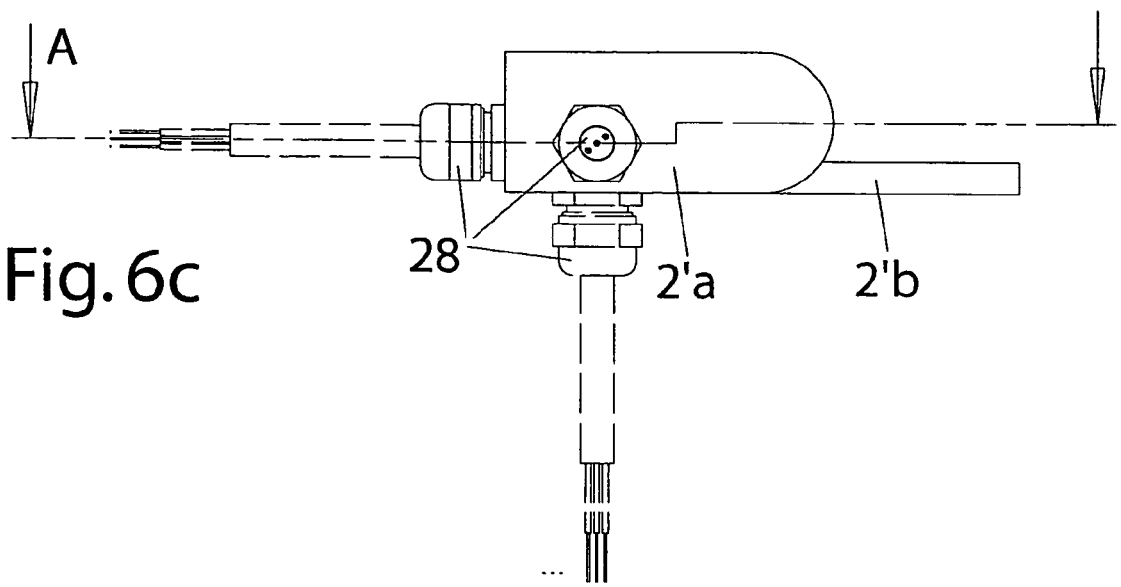
Figure 6B:
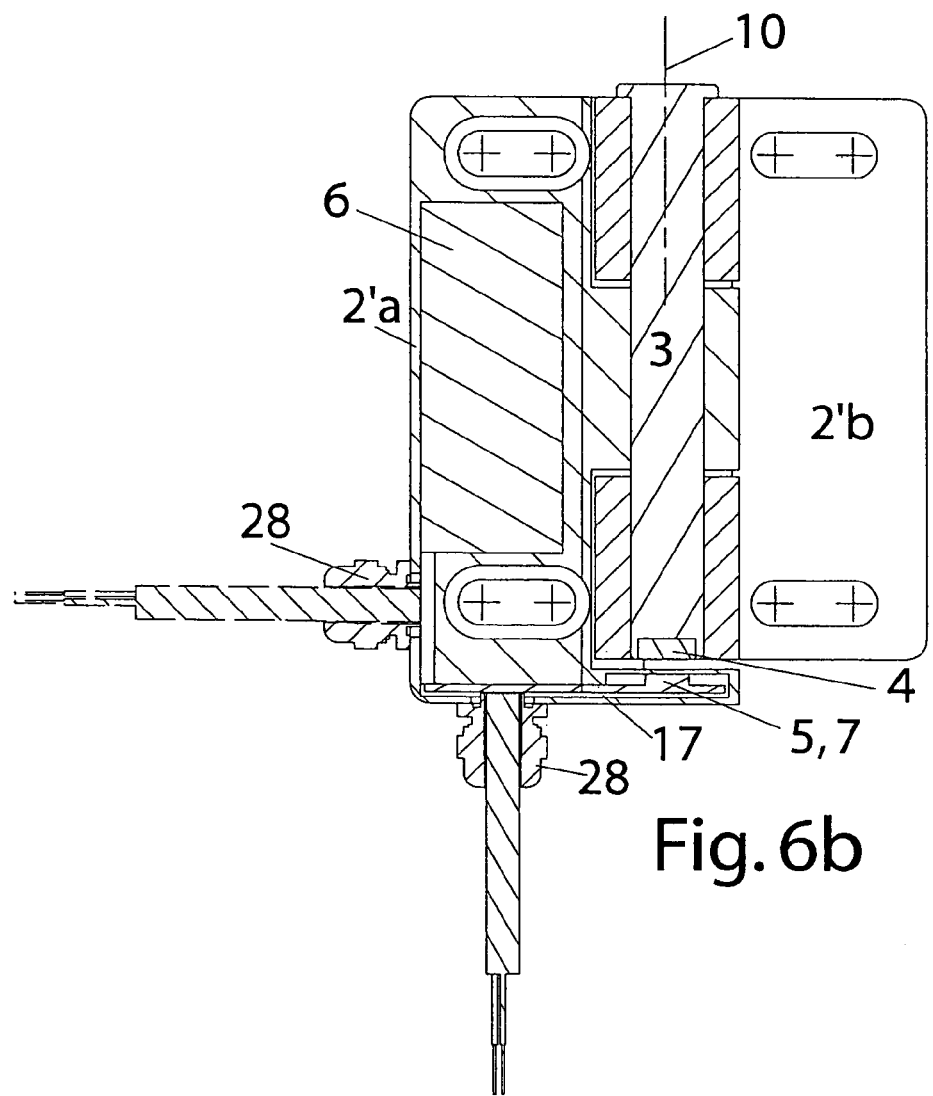

As is best shown in the expanded cut view of FIG. 6b, sensor unit 6 is integrated into one of hinge latches 2"a or located on it next to the pass-through component for bolt 3 so that a short and thin other arm 8.1 of housing 8 protrudes in front of the front face of the hinge thereby crossing its pivoting axis 10.

Thereby, it becomes apparent that microchip 7, serving as a sensor element 5 including its carrier printed circuit board 17, is located in this arm 8.1. Magnet 4 is placed in the front face of hinge bolt 3 opposite to microchip 7.

In this case, the other arm 8.2 of the housing can grow up or enlarge to a thickness of the hinge bolt area without interfering. This design provides much more interior space, e.g. for housing transmitters, receivers, or also a battery, or a rechargeable battery. This design is suitable, in particular, for new installations due to its integral design together with the one hinge latch 2'a.

Figure 7B:
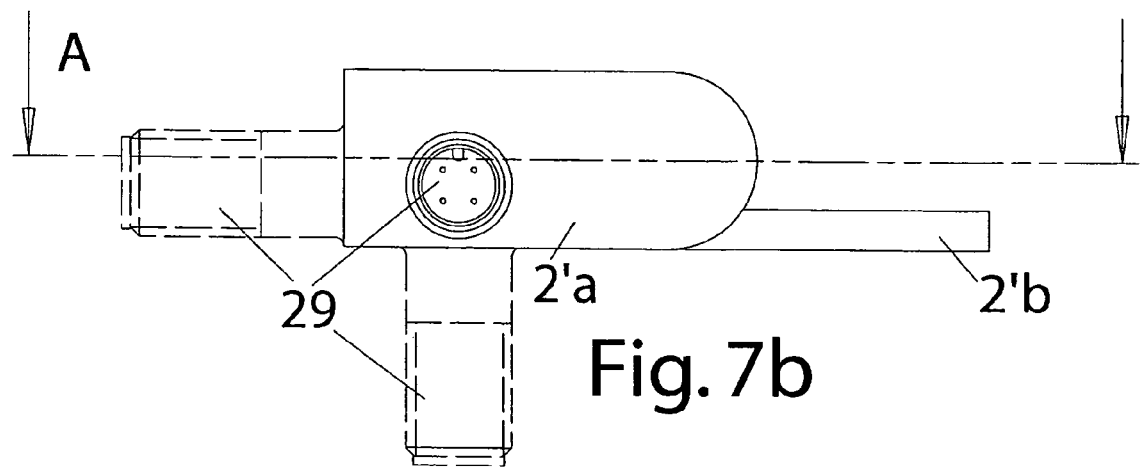
FIGS. 7a-b illustrate a second design for an initial installation.
Figure 7A:
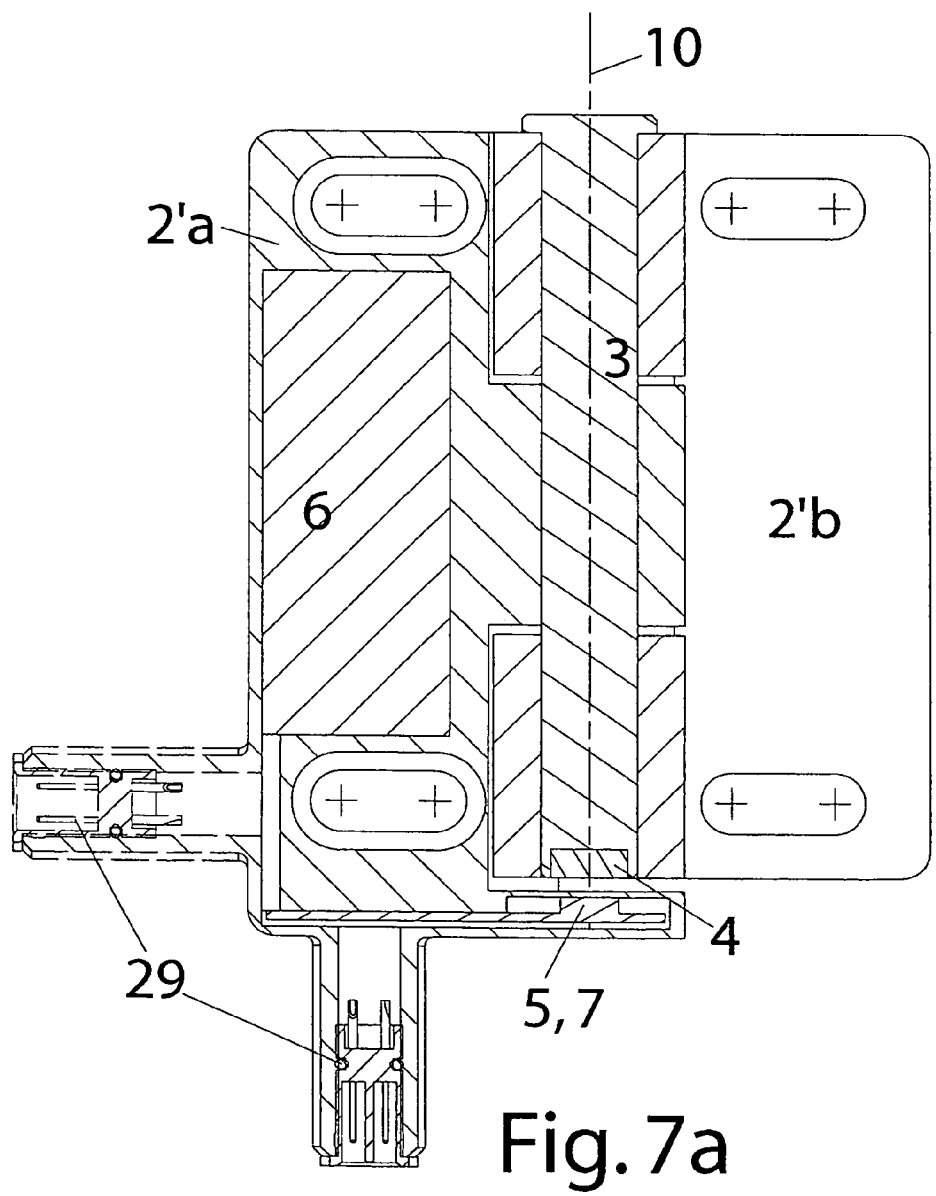

A cable exit, either shaped as a cable grommet 28 as shown in FIGS. 6b and 6c or formed as plug sockets 29 as shown in the analogous FIGS. 7a and 7b can be located, depending on the application, in one of the directions of the main plane of hinge latch 2a, which carries sensor unit 6, or can also protrude perpendicular to it. Wherein in FIGS. 6 and 7 all three possibilities are drawn out simultaneously, in reality, however, only one of them will be provided.

Figure 8A:
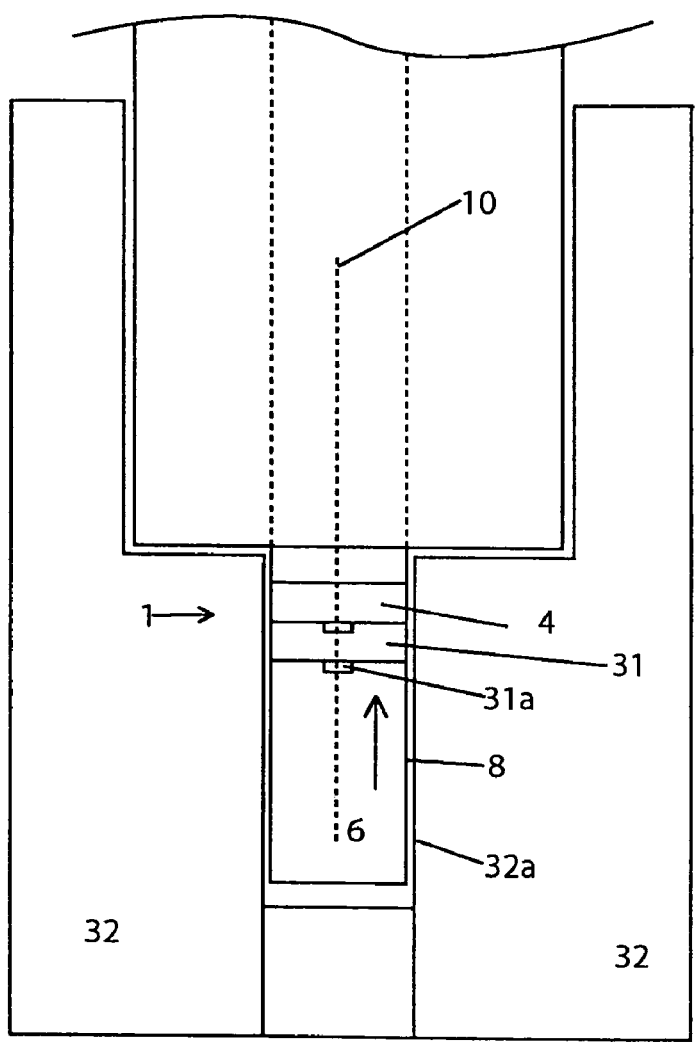
FIGS. 8a-b show the use of a mounting device.
Figure 8B:
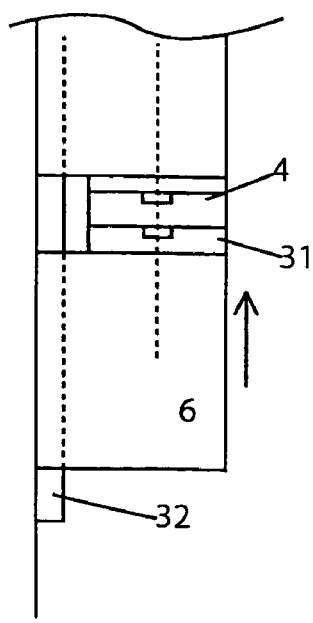

FIG. 8 shows the fast positioning and fastening of sensor 1 with a mounting device 32.

Initially, magnet 4 is positioned at a correct distance relative to an effective front face of housing 8 of sensor unit 6 by inserting a disk-shaped spacer 31 between this front face and magnet 4, having a protrusion 31a, or an indentation as a zero position marker in the direction towards the sensor unit 6, and also in the direction towards the magnet 4, so that these two subassemblies are not only positioned at the right distance, but also in the correct rotation position relative to each other.

The whole functional assembly comprising abutting magnets 4, spacer 31, and sensor unit 6 is now approached in the direction of the pivoting axis 10, with magnet 4 in front towards the component, e.g. the front face of hinge bolt 3 to which magnet 4 is to be fastened.

In order to keep the lateral misalignment and also the angular misalignment of the longitudinal axis 10' of sensor unit 6 relative to pivoting axis 10 of hinge 2 as small as possible, a mounting fixture 32 is previously attached to hinge 2 which is in mechanical contact with the front face of the hinge in axial direction and with the sides of the hinge in lateral direction and can be adjusted in its width if necessary.

Mounting fixture 32 has a free space 32a corresponding to the width of a functional group so that this functional group can be inserted into free space 32a, moved forward until magnet 4 abuts to the hinge, e.g. to hinge bolt 3. In this position, magnet 4 has to be pressed and glued relative to hinge 2. Also sensor unit 6 has to be pressed and glued, e.g. relative to the door frame.

After extracting spacer 31 between magnet 4 and sensor unit 6, the sensor is functional and mounting fixture 32 can be removed again.

FIGS. 9 show a design of the sensor wherein also magnet 4 is located in an interior of housing 8.

Thereby, magnet 4 is rotationally fixed on an inward facing surface of a shaft 30 which, in turn, is held in bearings in housing 8 so that it protrudes into the exterior of housing 8 with its other end.

Magnet 4 is located at a right distance relative to sensor element 5, in particular, relative to microchip 7.

This outward facing end of shaft 30 has a coupling device for coupling to the pivoting part of hinge 2, in particular of hinge bolt 3 so that after coupling, magnet 4 is rotationally fixed in a mechanical manner to the pivotable part of the hinge, e.g. hinge bolt 3.

In the manner as shown in FIG. 9b, shaft 30 can be rotationally fixed in a mechanical manner through any kind of mechanical drive system to the pivotable part of hinge 2. Thereby, sensor 1 can be located remotely from hinge 2.

Thus, FIG. 9b shows a solution wherein shaft 30 held in bearings in the housing is coupled via a flexible shaft 30' with the hinge bolt so that pivoting axis 10 of sensor 1 does not have to coincide any more with pivoting axis 10 of the hinge. Therefore, sensor 1 can be located at an upper crossbeam of a door frame.

Figure 9A:
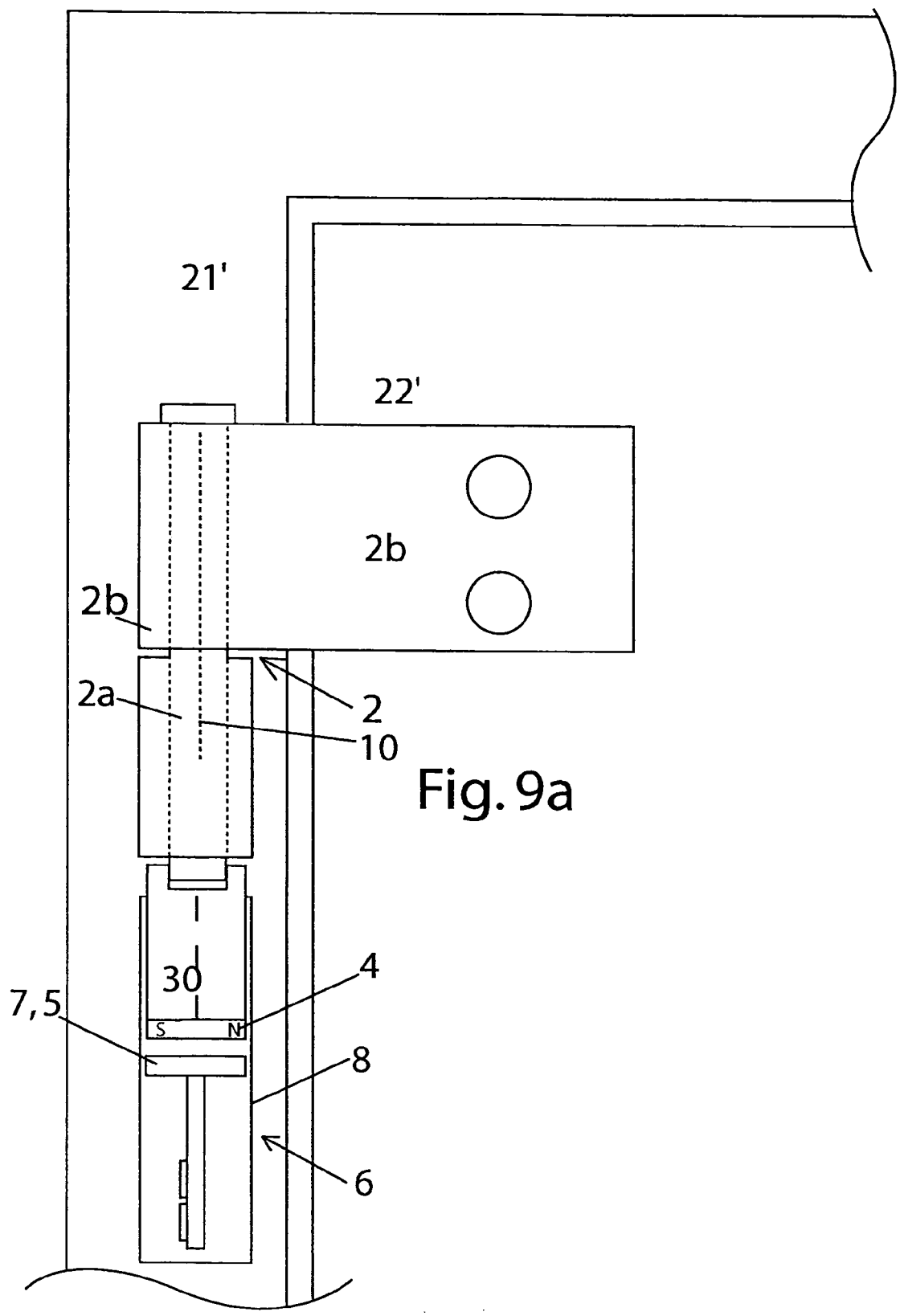

According to FIG. 9a, shaft 30 is directly coupled with hinge bolt 3 and, thereby, the longitudinal axis 10' of sensor 1 is in line with pivoting axis 10 of hinge 2.

REFERENCE NUMERALS

A Distance
1 Sensor
2 Hinge
2a,b Hinge latch
3 Hinge bolt
4 Generator magnet
5 Sensor element
6 Sensor unit
7 Microchip
8 Housing
9 LED
10 Pivoting Axis
10' Pivoting Axis
11 Monitoring center
12 Zero position marker
12' Zero position marker
13 Radio transmitter
14 Radio receiver
15 Adjustment device
16 Adjustment device
17 Printed circuit board
18 Mounting device
18a Base plate
18a Holder
19 Thread
20 Hinge bolt
21 Window frame
21' Door frame
22 Window
22' Door
23 Slot
24 Cable
25 Grommet
26 Base surface
27 Clamping bolt
28 Cable grommet
29 Connector socket
30 Shaft
30' Flexible shaft
31 Spacer
31a Protrusion
32 Mounting fixture
32 a Free space

What is claimed is:

1. A process for monitoring a functional position of a hinge (2) through a non-contacting sensor (1) operating with a magnetic field, said process comprising:
a rotation position generator having a magnet and a sensor unit (6) measuring over an angular range, the rotation position magnet generator and the sensor unit (6) with a sensor element (5) are opposed to each other at a distance and are rotationally fixed, on the one hand, to one pivoting component of the hinge (2), and on the other hand, to one non-moving component of the hinge (2) or of a hinge carrying component.

2. A process according to claim 1 wherein said rotation position generator and said sensor unit (6) are positioned on an extended pivoting axis (10) of said hinge (2).

3. A process according to claim 1 wherein said rotation position generator is rotationally fixed to the pivotable part of said hinge (2) and offset from said hinge (2), and said rotation position generator and said sensor unit (6) are located remote from a pivoting axis (10) and/or with their pivoting axis (10') positioned at an angle relative to the pivoting axis (10) of said hinge.

4. A process according to one of the claim 1 wherein the rotation position generator having the magnet (4) is rotationally fixed to one of the pivotable parts of said hinge (2) on the pivoting axis (10) at the front face of said hinge (2), and
said sensor unit (6) with said sensor element (5) is positioned at a distance opposing the rotation position generator.

5. A process according to claim 1 wherein a current rotation position of said hinge (2) is detected through said sensor (1).

6. A process according to claim 1 wherein said sensor (1) transmits its signals wirelessly to a monitoring center (11) and/or is supplied with energy in a wireless manner.

7. A process according to claim 1 wherein proper functioning of said sensor (1) is optically indicated at the sensor with at least one LED (9) which is visible through a transparent housing (8) of said sensor (1).

8. A process according to claim 1 wherein said magnet (4) is rotationally fixed to the component representing a functional position of said hinge with a hinge bolt, or one of the hinge latches (2*a, b*), snapped on, or glued on and said sensor unit (6) is mounted to a non-moving hinge latch (2*b*), or to the component carrying it.

9. A process according to claim 1 wherein said rotation position indicator and said sensor unit (6) are mounted retroactively.

10. A process according to claims 1 wherein said sensor unit (6) and/or the magnet (4) have a zero position marker (12), and said magnet (4) is fastened so that the magnet (4), before mounting to said hinge (2), with respect to its zero position marker can be rotationally fixed through interlocking with said sensor unit (6), and can be pressed by said sensor unit (6) in the direction of a pivoting axis (10') against the hinge until it contacts.

11. A process according to claim 1 wherein before mounting said sensor unit (6) and after fastening said magnet (4) to said hinge (2), said sensor unit (6), contacting in an interlocking manner with its zero position indicator (12'), is aligned with a zero position indicator (12) of said magnet (4) and is subsequently pulled back along a pivoting axis (10') of said sensor unit (6) to maintain a distance.

12. A process according to claim 1 wherein said magnet (4) and said sensor unit (5) together with a respective mounting fixture are aligned relative to each other with regard to their respective zero position in rotation, aligned at the right distance relative to each other in longitudinal direction, and positioned in this alignment relative to said hinge (2), glued.

13. A sensor (1) with a rotational position indicator and a sensor unit (6) for monitoring a current rotation position of hinge latches (2*a, b*) of a hinge (2) relative to each other, said sensor comprising:

the sensor unit (6) is impacted in a wireless manner through a magnetic field from a rotation position generator (4), pivotable around a rotation axis (10') relative to the sensor unit (6), rotationally fixed to the pivotable hinge axle.

14. A sensor (1) according to claim 13 wherein said rotation position generator includes a magnet (4) having varied magnetic strength along its circumference around the pivoting axis (10').

15. A sensor according to claim 13 wherein as a sensor element (5) in the sensor unit (6) a microchip (7) is being used, located with its main plane perpendicular to the pivoting axis (10') of a generator magnet (4).

16. A sensor according to claim 13 wherein through a generator magnet (4), the sensor element (5) is affected without in an intermediary element.

17. A sensor according to claim 13 wherein said sensor element (5) includes magneto resistive characteristics and/or a Hall element.

18. A sensor according to claim 13 wherein a magnet (4) is directly located on a front face of either said pivotable hinge latch (2*a*), or of a hinge bolt (3), rotationally fixed to said pivotable hinge latch (2*a*), outside of a housing (8) of said sensor unit (6).

19. A sensor according to claim 13 wherein a magnet (4) is located in an interior of a housing (8) of said sensor unit (6) on a rotating shaft (30), held bearings in the housing (8), so it can rotate, reaching through the housing (8) to the outside and rotationally fixed in a mechanical manner to the pivotable hinge latch or the hinge bolt, through a drive system.

20. A sensor according to claim 19 wherein said drive system is a flexible shaft.

21. A sensor according to claim 14 wherein said sensor unit (6) and/or said magnet (4) include a zero position indicator (12, 12').

22. A sensor according to claim 13 wherein said sensor unit (6) includes at least a LED (9) as a functional indicator in an interior of a transparent housing (8) of said sensor unit (6).

23. A sensor according to claim 13 wherein said sensor unit (6) includes a transmitter and/or a receiver.

24. A sensor according to claim 13 wherein said sensor unit includes two sensor elements (5) (two microchips (7)) with their main planes in parallel to each other at a small distance located on a front and on a back side of a same printed circuit board (17).

25. A sensor according to claim 14 wherein said magnet (4) includes at least one pair of poles distributed along a circumference around the pivoting axis (10).

26. A sensor according to claim 13 wherein a housing (8) of said sensor unit (6) is closed tight and electronics in an interior of the housing (8) are encased.

27. A sensor according to claim 13 wherein said sensor unit (6) further includes a mounting device for a mounting device (18) of said sensor unit (6) on a surrounding component, and the mounting device (18) includes at least one first adjustment device (15) for adjusting said sensor unit (6) in a direction of the pivoting axis (10') of said sensor unit (6) and/or a second adjustment device (16) for adjusting said sensor unit (6) perpendicular to the pivoting axis (10) of said hinge (2) in at least one perpendicular direction.

28. A sensor according to claim 27 wherein said mounting device (18) has two parts, a base plate (18*a*) and a holder piece (18*b*), precisely slideable relative to a direction of the pivoting axis (10'), in which said housing (8) is fixed.

29. A sensor according to claim 13 wherein said sensor unit (6) includes a cylindrical housing (8), having a diameter that is not larger than a diameter of said hinge (2), in the bolt area, and not larger than 18 mm, and a mounting device (18) includes a hollow cylindrical having a circumferentially enclosed pass-through hole.

30. A sensor according to claim 29 wherein said housing (8) includes a non-round outer cross section, axially slideable in the pass-through opening of said mounting device (18), of the holder (18*b*).

31. A sensor according to claim 29 wherein at an outer circumference of said housing (8) of said sensor unit (6) a thread (19) for mounting relative to said mounting device is located.

32. A sensor according to claim 13 wherein said sensor unit (6) with its housing (8) is directly fastened to a surrounding carrier component, glued in.

33. A sensor according to claim 13 wherein a housing (8) is provided L-shaped and in one arm at least said sensor element (5) of said sensor unit (6) is located and the other arm is sized for mounting on one of said hinge latches (2*a, b*).

34. A sensor according to claim 13 wherein said sensor unit (6) is located in a hinge bolt (3) and in the housing (8) of said sensor unit (6) is the hinge bolt (20).

35. A sensor according to claim 34 wherein said hinge bolt (3) is rotationally fixed to one of said hinge latches (2*a* or 2*b*) and the generator magnet (4) is rotationally fixed to the other hinge latch (2*b*) or (2*a*).

36. A sensor according to claim 35 wherein said sensor element (5) is located close to a free end of the hinge bolt (3), which is in front in insertion direction.

\* \* \* \* \*